(12) United States Patent
Rinehart et al.

(10) Patent No.: US 9,086,521 B2
(45) Date of Patent: Jul. 21, 2015

(54) LIGHT TRANSMISSIVE STRUCTURES AND FABRICATION METHODS FOR CONTROLLING FAR-FIELD LIGHT DISTRIBUTION

(75) Inventors: Thomas A. Rinehart, Durham, NC (US); Robert L. Wood, Apex, NC (US); Ken G. Purchase, Morrisville, NC (US)

(73) Assignee: Bright View Technologies Corporation, Richmond, VA (US)

(*) Notice: Subject to any disclaimer, the term of this patent is extended or adjusted under 35 U.S.C. 154(b) by 0 days.

(21) Appl. No.: 14/007,472

(22) PCT Filed: Mar. 29, 2012

(86) PCT No.: PCT/US2012/031056
§ 371 (c)(1),
(2), (4) Date: Sep. 25, 2013

(87) PCT Pub. No.: WO2012/141899
PCT Pub. Date: Oct. 18, 2012

(65) Prior Publication Data
US 2014/0022783 A1    Jan. 23, 2014

Related U.S. Application Data

(60) Provisional application No. 61/475,575, filed on Apr. 14, 2011.

(51) Int. Cl.
*F21V 1/00* (2006.01)
*G02B 5/02* (2006.01)
(Continued)

(52) U.S. Cl.
CPC .............. *G02B 5/0221* (2013.01); *F21V 3/049* (2013.01); *F21V 5/002* (2013.01); *G02B 5/0278* (2013.01); *G02B 5/0294* (2013.01)

(58) Field of Classification Search
CPC ........ F21V 3/049; F21V 5/002; G02B 5/0221
USPC ............................ 362/335, 337, 339; 359/707
See application file for complete search history.

(56) References Cited

U.S. PATENT DOCUMENTS

| | | | |
|---|---|---|---|
| 1,589,370 A * | 6/1926 | Conover | ........................ 362/309 |
| 4,703,405 A | 10/1987 | Lewin | |

(Continued)

FOREIGN PATENT DOCUMENTS

| | | |
|---|---|---|
| WO | WO 00/10835 A1 | 3/2000 |
| WO | WO 02/23258 A2 | 3/2002 |
| WO | WO 2011/046864 A1 | 4/2011 |

OTHER PUBLICATIONS

International Search Report and Written Opinion of the International Searching Authority, PCT Application No. PCT/US2012/031056, Jul. 20, 2012.

(Continued)

*Primary Examiner* — Ali Alavi
(74) *Attorney, Agent, or Firm* — Myers Bigel Sibley & Sajovec, PA

(57) ABSTRACT

Light transmissive structures include a light transmissive substrate that includes optical microstructures. The optical microstructures have a geometric feature that is configured to reduce glare in light transmitted through the light transmissive structure. Moreover, the plurality of optical microstructures also have a geometric feature that is configured to vary randomly and/or pseudorandomly across the light transmissive substrate so as to diffuse light transmitted through the light transmissive structure. Related fabrication methods are also described.

25 Claims, 7 Drawing Sheets

(51) Int. Cl.
*F21V 5/00* (2015.01)
*F21V 3/04* (2006.01)

(56) References Cited

U.S. PATENT DOCUMENTS

| | | | |
|---|---|---|---|
| 4,725,934 A | 2/1988 | Gordin | |
| 4,907,143 A | 3/1990 | Lasker | |
| 5,363,293 A | 11/1994 | Lasker | |
| 5,486,989 A | 1/1996 | Compton | |
| 5,613,769 A * | 3/1997 | Parkyn et al. | 362/338 |
| 5,730,521 A | 3/1998 | Spink et al. | |
| 5,746,502 A * | 5/1998 | Huang | 362/223 |
| 6,027,231 A | 2/2000 | Fouke | |
| 6,193,394 B1 | 2/2001 | Herst et al. | |
| 6,354,725 B1 | 3/2002 | Simon | |
| 6,698,908 B2 | 3/2004 | Sitzema, Jr. et al. | |
| 7,156,540 B2 | 1/2007 | Haines | |
| 7,190,387 B2 | 3/2007 | Rinehart et al. | |
| 7,192,692 B2 | 3/2007 | Wood et al. | |
| 7,213,948 B2 | 5/2007 | Hein | |
| 7,660,039 B2 | 2/2010 | Santoro et al. | |
| 7,837,361 B2 | 11/2010 | Santoro et al. | |
| 7,867,695 B2 | 1/2011 | Freese et al. | |
| 7,918,589 B2 * | 4/2011 | Mayfield et al. | 362/299 |
| 2004/0120152 A1 | 6/2004 | Bolta et al. | |
| 2007/0091617 A1 | 4/2007 | Couzin et al. | |
| 2008/0106793 A1 | 5/2008 | Olczak | |
| 2009/0122540 A1 * | 5/2009 | Chiang et al. | 362/235 |
| 2009/0141487 A1 * | 6/2009 | Gould et al. | 362/223 |
| 2009/0285543 A1 * | 11/2009 | Marttila et al. | 385/146 |
| 2010/0039808 A1 | 2/2010 | Purchase et al. | |
| 2011/0085241 A1 | 4/2011 | Purchase et al. | |
| 2012/0019936 A1 * | 1/2012 | Blessing et al. | 359/742 |
| 2012/0127755 A1 * | 5/2012 | Shiau et al. | 362/607 |

OTHER PUBLICATIONS

Communication with Supplementary European Search Report, EP Application No. 12771143.0, Sep. 25, 2014.

* cited by examiner

LIGHT TRANSMISSIVE STRUCTURES AND FABRICATION METHODS FOR CONTROLLING FAR-FIELD LIGHT DISTRIBUTION

CROSS REFERENCE TO RELATED APPLICATION

The present application claims priority to U.S. provisional Patent Application No. 61/475,575, filed Apr. 14, 2011, entitled Light Management Devices for Controlling Far Field Light Distribution, the disclosure of which is hereby incorporated herein by reference in its entirety.

BACKGROUND

Many commercially important consumer devices require management of light into a space. Examples include various displays such as televisions, computer displays, projection screens, illuminated signs, and light fixtures (luminaires). In each of these applications, there may be an optimum "far-field" pattern of light for achieving the best combination of performance and efficiency. The "far-field" pattern, broadly speaking, describes the variation of brightness of light transmitted from a source and illuminating a distant surface. For example, the far-field pattern of a flashlight may be visualized by shining the light on to a dark wall at some distance from the flashlight, and observing the variation in brightness on the wall.

In ceiling-mounted light fixtures, lighting designers generally strive to provide a far-field illumination pattern that fills a desired space with an even illumination pattern. For ceiling-mounted light fixtures, light exiting the luminaire in a downward direction (perpendicular to the ceiling and floor) provides far-field illumination that is most favorable for achieving usable lighting, while light that exits in a sideward direction (parallel to the ceiling and floor) tends to illuminate wall areas, which may indirectly contribute to a desirable illumination pattern. Light exiting the fixture at intermediate angles, most particularly at angles between 60-85° from vertical, are least desirable, since this light contributes little to illumination in the vicinity of the fixture, and also contributes to "glare zone" light that may be annoying or distracting to occupants in the illuminated space. Light exiting in the glare zone angles of 60-85° may be too easily seen by occupants at relatively short distances from the light. This light may be much brighter than the surrounding illumination because it is observed directly rather than as diffuse reflection from objects in the illuminated space. This glare light may reflect from work surfaces and video displays, reducing visibility.

For decades, lighting manufacturers have devised various approaches for minimizing glare light from ceiling fixtures. Approaches include mechanically baffling the fixture so light rays that would otherwise exit the fixture in the "glare zone" instead strike an opaque barrier that either reflects or absorbs the light. Other approaches use parabolically or ellipsoidally shaped reflectors to reflectively direct most light in a downward direction, thereby reducing light exiting in the glare zone. Yet another approach is the use of one or more refractive lenses or arrays of refractive lenses that help to direct light in a more downward direction, away from the glare zone. These approaches have been used alone or in combination. Some approaches are embodied in U.S. Pat. Nos. 4,703,405; 4,725,934; 4,907,143; 4,947,303; 5,363,293; 5,486,989; 5,730,521; 6,027,231; 6,193,394; 6,354,725; 6,698,908; 7,156,540; 7,213,948; 7,660,039; and 7,837,361.

Although glare control approaches described above may be effective in controlling glare in luminaires with conventional light sources such as fluorescent lamps, these approaches generally are not effective in "lamp hiding" i.e. obscuring the source of illumination when viewed directly. This lack of hiding ability has been accepted in the industry because the lamp image produced by conventional sources is not considered an aesthetic liability by most lighting designers. Structures used in most glare control approaches share the characteristic of being easily visible to a viewer, for example, an array of louvers arranged in a grid pattern to reduce glare in a fluorescent ceiling troffer. Use of visible structures for glare control generally prevents the lighting designer from achieving a "smooth" look, whereby the output face of the light provides a clean, uniform glow. Moreover, glare control achieved by mechanical structures may be less efficient since glare light may be absorbed rather than redirected toward non-glare exit angles.

Certain conventional glare-control sheets are made using a transparent sheet with cone-shaped protrusions on one surface and a smooth opposing surface. When applied to a light with the smooth surface facing the light source and the cone surface facing the viewer, such glare-control sheets can use refraction to effectively limit the light at high angles, as described, for example, in U.S. Pat. No. 2,474,317. These conventional refractive glare control products often use arrays of cones of substantially identical base angle, and often using a base diameter of one to several millimeters. They often have a harsh "cutoff" in which the intensity drops rapidly at the edge of the "glare zone" and creates unwanted visual effects. These can include to the perception of a dark zone crossing the surface of the luminaire, and in some cases color separation (such as orange edges) at the edge of the dark zone.

The approaches described in this section could be pursued, but are not necessarily approaches that have been previously conceived or pursued. Therefore, unless otherwise indicated herein, the approaches described in this section are not prior art to claims in this application and any application claiming priority from this application, are not admitted to be prior art by inclusion of this section, and may be attributed to the present inventors' appreciation of the problem to be solved.

SUMMARY

Light transmissive structures according to various embodiments described herein include a light transmissive substrate that includes a plurality of optical microstructures. The plurality of optical microstructures have a geometric feature that is configured to reduce glare in light transmitted through the light transmissive structure. Moreover, the plurality of optical microstructures also have a geometric feature that is configured to vary randomly and/or pseudorandomly across the light transmissive substrate so as to diffuse light transmitted through the light transmissive structure. Accordingly, glare reduction and source obscuration may be provided by the design of the plurality of optical microstructures.

In some embodiments, the plurality of optical microstructure may also have a geometric feature that is configured to produce a visible indicia relative to a viewer of the light transmissive structure. Accordingly, glare reduction, source obscuration and a visible indicia may be provided by the design of the optical microstructures. In still other embodiments, glare reduction and a visible indicia may be provided by the design of the optical microstructures without providing source obscuration.

In some embodiments, glare reduction may be provided by reducing brightness of light emerging from the light transmissive structure at angles greater than about 60° from a direction orthogonal to the light transmissive substrate relative to light emerging from the light transmissive structure in the direction orthogonal to the light transmissive substrate. In other embodiments, the light may be reduced to less than about 25% of the light emerging in the orthogonal direction.

It would not be predictable that glare reduction and source obscuration could be provided using a plurality of optical microstructures, according to various embodiments described herein. More specifically, it would not be expected that randomization could be provided for light obscuration, while still providing effective glare reduction without creating unwanted visual effects, such as a dark zone and/or color separation. Yet various embodiments described herein allow a plurality of optical microstructures to be configured to provide glare reduction and source obscuration and, in some embodiments, to provide visible indicia.

In some embodiments, the plurality of microstructures comprise a plurality of cones, inverted cones, spheroids, inverted spheroids, prisms, inverted prisms, pyramids and/or inverted pyramids. Moreover, the geometric figure that is configured to reduce glare and to vary randomly and/or pseudorandomly, may be the same geometric features or different geometric features of the plurality of optical microstructures. Moreover, the geometric feature that is configured to reduce glare and the geometric feature that is configured to vary randomly and/or pseudorandomly, may comprise a size and/or shape of the plurality of optical microstructures. The optical microstructures may have a dimensions along the light transmissive substrate that is less than about 100 μm. Finally, any of the embodiments described herein may be combined with at least one light source and a housing that is configured to hold the at least one light source and the light transmissive substrate, to provide a light fixture or luminaire.

Light transmissive structures according to various other embodiments described herein can provide a light transmissive substrate including a plurality of optical microstructures. The plurality of optical microstructures have a base angle that varies randomly and/or pseudorandomly across the light transmissive substrate between about 10° and about 60° from a direction orthogonal to the light transmissive substrate. In some embodiments, the base angle varies randomly and/or pseudorandomly across the light transmissive substrate between about 35° and about 55° from the direction orthogonal to the light transmissive substrate. In yet other embodiments, the base angle varies randomly and/or pseudorandomly across the light transmissive substrate between about 48° and about 54° from the direction orthogonal to the light transmissive substrate. In still other embodiments, the base angle also varies as a function of distances greater than about 100 μm across the light transmissive substrate, to provide a visible indicia.

Light transmissive structures may be fabricated according to various embodiments described herein by imaging into a photoimageable material an image of a plurality of optical microstructures having a geometric feature that is configured to reduce glare in light transmitted through the optical microstructures and also having a geometric feature that is configured to vary randomly and/or pseudorandomly across the photoimageable material. The photoimageable material that was imaged is then used to replicate a plurality of microstructures in and/or on a substrate, the plurality of optical microstructures also having a geometric feature that is configured to reduce glare in light transmitted through the optical microstructures and also having a geometric feature that is configured to vary randomly and/or pseudorandomly across the substrate so as to diffuse light transmitted through the optical microstructures. The imaging may be performed by scanning a laser across the photoimageable material, the laser defining the image of a plurality of optical microstructures having the geometric feature that is configured to reduce glare in light transmitted through the optical microstructures and also having the geometric feature that is configured to vary randomly and/or pseudorandomly across the photoimageable material.

DETAILED DESCRIPTION

Figure 1:
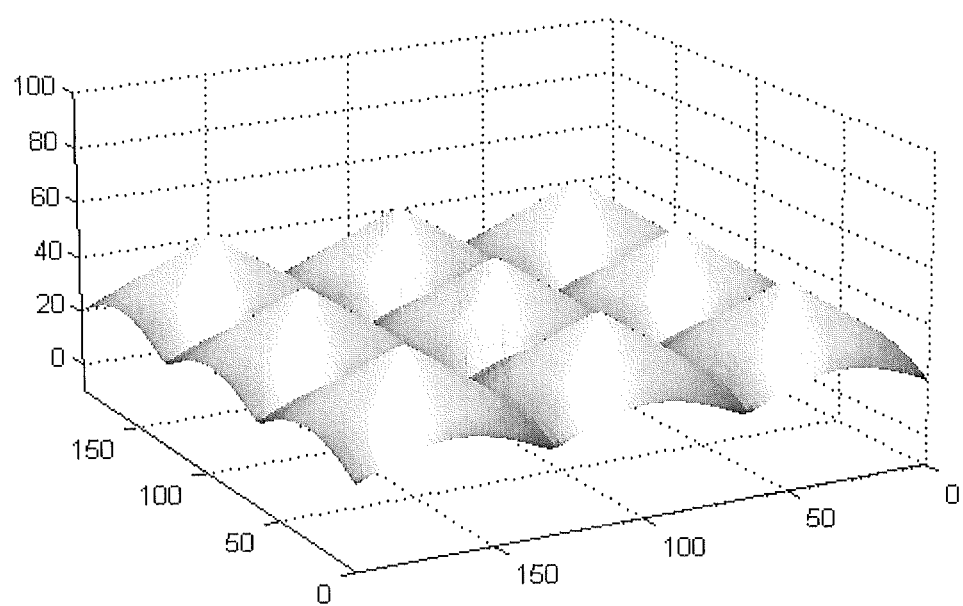
FIG. 1 illustrates a plurality of optical microstructures that include upright cones on a rectangular grid, according to various embodiments described herein.

Various embodiments described herein can provide light control structures that can combine effective control of light in the glare zone of, for example, ceiling mounted light fixtures, and can also provide effective obscuration and spatial mixing of LED point sources in the fixture. Embodiments are provided that employ microstructures on the surface of a transparent film or rigid panel affixed to the light fixture. Various embodiments can also provide an aesthetically appealing appearance at the output face (viewer side) of the fixture.

With the growth of solid state lighting driven by the broad availability of low-cost white light and/or other LEDs, there is now an emerging need for glare control techniques which can achieve glare control in a more efficient manner, but can also provide lamp obscuration and a pleasing look in the luminaire. LEDs are by nature point sources, and producing 1000-4000 lumens light output typical of a ceiling fixture currently may require many tens or even hundreds of LEDs in unison. Commercial acceptance of LED ceiling luminaires has generally required the use of diffusers to obscure the individual LEDs. Such diffusers have been designed to provide diffusion sufficient for hiding, but with high efficiency. Conventional glare control structures such as baffles are generally not acceptable in the LED lighting market because of their impact on efficiency. Conventional refractive glare control structures are also undesirable because they cannot obscure the LEDs sufficiently and may need to be combined with lamp obscuring diffusers that may reduce the effectiveness of the glare control structure.

In some embodiments, microstructures interact refractively with light exiting a fixture such as to reduce the brightness of light in the glare zone of exit angles between about 60-85° from vertical, relative to light outside the glare zone. In some embodiments, arrays of refractive microstructures arranged on the surface of a transparent layer may have a cone shape with a base diameter and base angle. Other embodiments may have arrays of refractive microstructures that have the shape of an inverted cone (a negative cone) that encloses a volume of air having a cone shape with a base diameter and base angle. Other embodiments may have arrays of microstructures that have the shape of a section of a sphere with a radius and base diameter, such as a hemisphere. Some embodiments may include arrays of pyramid-shaped microstructures having three or four sides, a base width, and a base angle. Pyramid-shaped microstructures may be of the positive or negative type. Yet other embodiments include arrays of linear microstructures with prism-like shape having a base width and base angle.

Moreover, various embodiments can provide arrays of microstructures arranged on the surface of a transparent layer (film or rigid panel) wherein the placement and/or size of the individual microstructures is randomized. Randomization is effective in achieving improved source hiding and also eliminating unwanted color separation exemplified by some of the above-described approaches. Randomization is also effective in softening the harsh intensity drop at the edge of the glare zone observed in other anti-glare techniques. In some embodiments, various types of microstructures such as cones, pyramids, and prisms, may be combined in various proportions. Embodiments include microstructures having horizontal dimensions generally in the range of 1-200 μm and vertical dimensions generally from 1-100 μm, and in some embodiments with horizontal dimension in the range of 30-90 μm and vertical dimension in the range of 10-60 μm. in general, the optical microstructures may have a dimension along the light transmissive substrate that is less than about 100 μm. Cone, pyramid, and prism shaped microstructures may have base angles generally in the range of 10-60°, and in some embodiments in the range of 35-55°.

Yet other embodiments provide arrays of microstructures arranged on the surface of a transparent layer wherein the placement and/or size of the individual microstructures is randomized, and the randomization varies from one spatial location to another in such a way as to form visual indicia. The visual indicia are on spatial scale of 0.5 mm to 3 m, and in some embodiments with spatial scale of 1 mm to 300 mm. In general, the geometrical features may vary as a function of distances greater than about 100 μm across the substrate to produce the visible indicia. The visual indicia may appear as patterns, gradients, pictures, or any other indicia visible to the naked eye.

Some embodiments provide a ceiling mounted luminaire equipped with glare control according to various embodiments described herein. These embodiments may provide a light output profile whereby light exiting the luminaire at angles steeper than 60° from vertical is reduced to 25% or less than light exiting vertically from the fixture, and thereby provides acceptable control of light in the glare zone.

Other embodiments provide a ceiling mounted luminaire equipped with glare control according to various embodiments described herein and can also provide complete or near-complete obscuration of the individual light sources within the luminaire. These embodiments may further provide an aesthetically attractive appearance on the output face of the fixture.

Accordingly, various embodiments described herein can provide light management devices for controlling far field light distribution by providing a microstructure array having various geometrical features. One feature, such as a slope of the microstructure walls, may be set to suppress glare. This feature and/or another geometric feature of the microstructures may be randomized, in some embodiments on a microscopic scale, e.g., smaller than the eye can resolve. Randomizing can obscure the light sources from the viewer. Moreover, indicia may be created by varying these and/or other features on a larger visual scale. The three aspects of glare control, source obscuration and visual indicia can be controlled reasonably independently by varying three different features and/or groups of sometimes overlapping features for each. Moreover, subcombinations of glare reduction, source obscuration and visible indicia may also be provided according to various embodiments described herein.

Various techniques for source obscuration in a diffuser are described in U.S. Patent Application Publication No. 2010/0039808 to Purchase et al., entitled Optical Diffusers With Spatial Variations, published Feb. 18, 2010, assigned to the assignee of the present application, the disclosure of which is hereby incorporated herein by reference as if set forth fully herein. Moreover, various techniques for producing visible indicia using optical microstructures are described in U.S. patent application Ser. No. 12/901,754 to Purchase et al., entitled Transmissive Optical Microstructure Substrates That Produce Visible Patterns, filed Oct. 11, 2010, assigned to the assignee of the present application, the disclosure of which is hereby incorporated herein by reference as if set forth fully herein. The techniques described in these two patent applications may be used instead of, or in addition to, techniques described herein, for source obscuration and visible indicia production, respectively.

In one design of the glare-reducing surface, the individual microstructure elements are all upright cones having cylindrical symmetry, each having a height of 30 μm, a base width of 64 μm, and a side slope that forms a base angle of 54°. The cones are arranged in a repeating rectangular pattern, with nearest tips being spaced at a distance of 64 μm. In order to situate the circular footprint structures on a grid, the cones are truncated so that they join along curved valleys as seen in FIG. 1. While this design effectively decreases the amount of intensity in the glare zone, it may provide very little LED source hiding, and may give rise to rainbows and other color separation artifacts.

Figure 2:
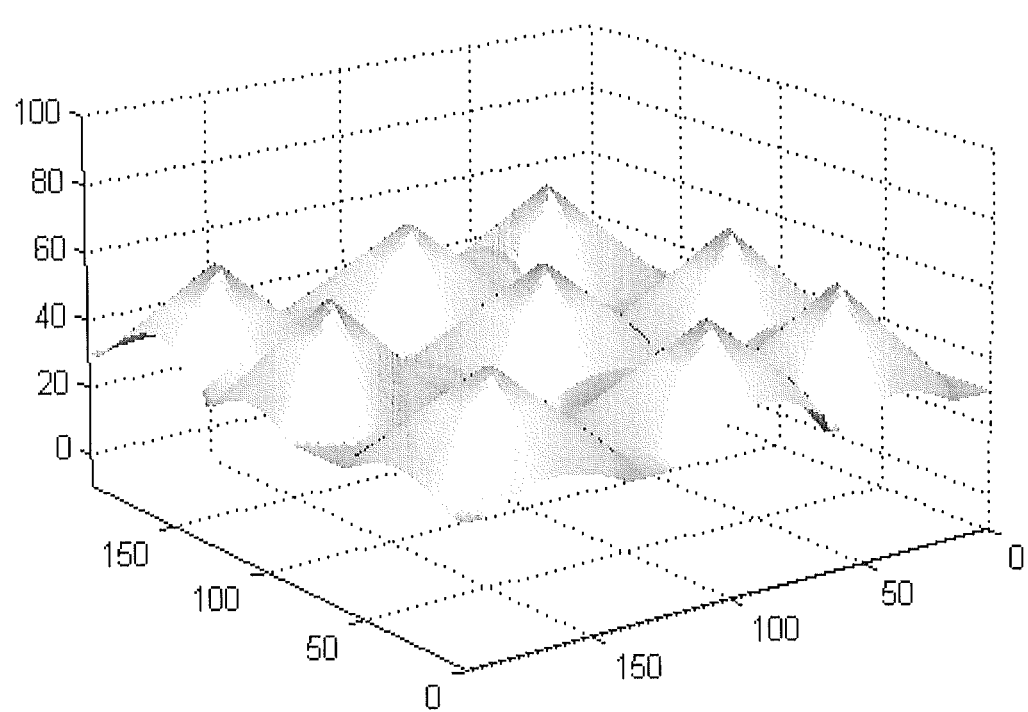
FIG. 2 illustrates a plurality of optical microstructures that include randomized upright cones on a rectangular grid, according to various embodiments described herein.

A similar reduction of glare may be achieved by the design shown in FIG. 2. Here the cones' base angles randomly vary from 48° to 54°, and their positions are shifted as much as 15 μm in a random direction from a regular rectangular grid. This surface topology retains the glare control of the non-randomized array, and additionally provides significantly improved hiding of LED light sources and reduction of rainbows and color artifacts.

Figure 3:
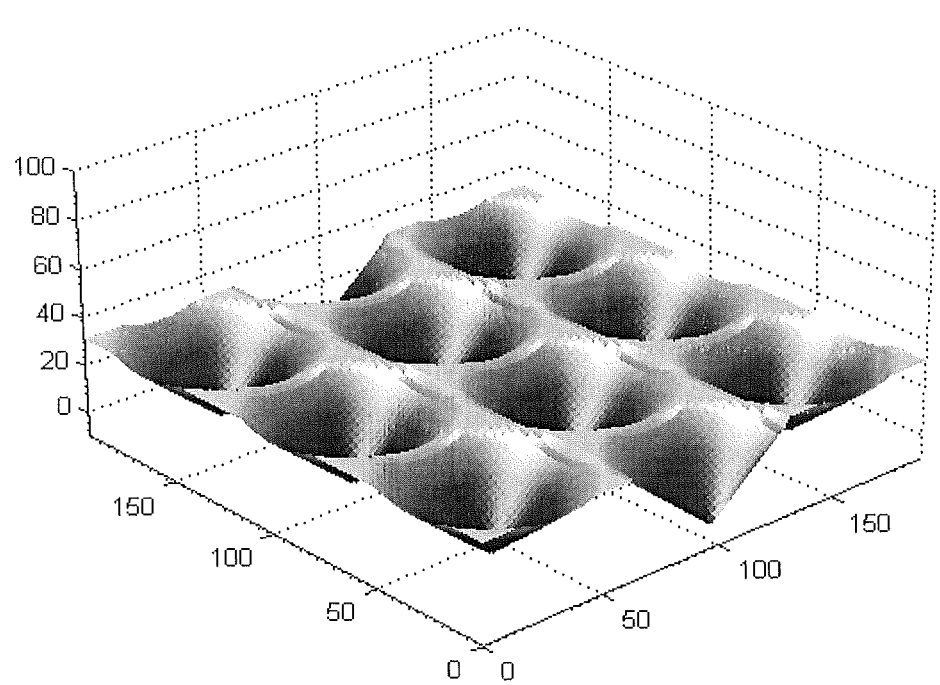
FIG. 3 illustrates a plurality of optical microstructures that include inverted hexagonal packing cones, according to various embodiments described herein.
Figure 4:
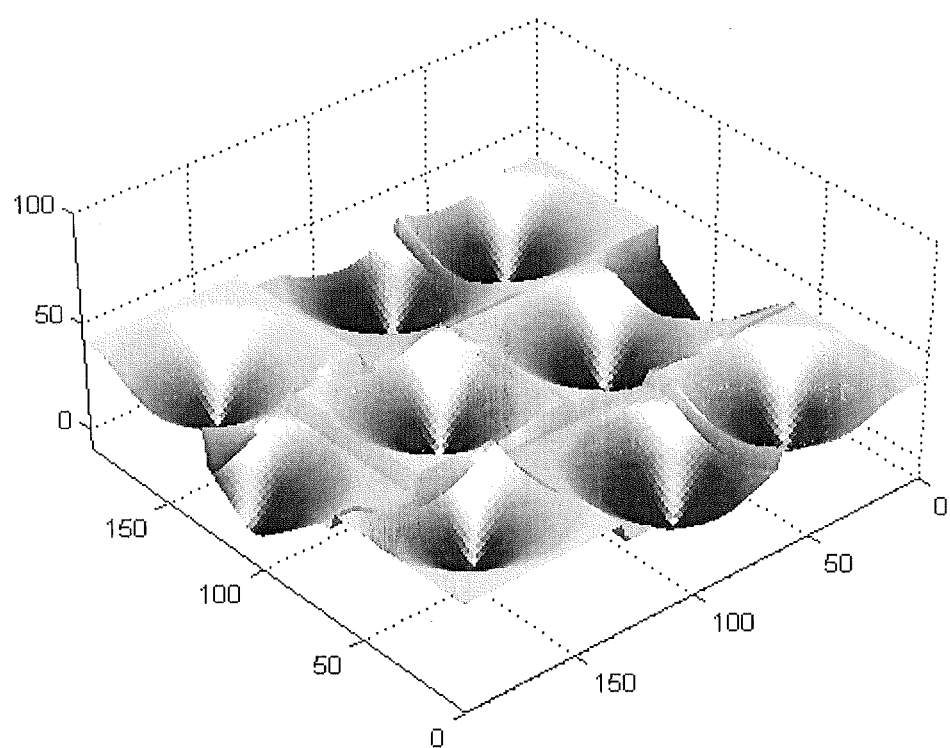
FIG. 4 illustrates a plurality of optical microstructures that include randomized inverted hexagonal packing cones, according to various embodiments described herein.

In another design of the anti-glare structures, the surface is comprised of inverted cones having a depth of 32 μm, a base width of 64 μm, and a base angle of 48°. FIG. 3 shows these structures arranged according to a hexagonal packing. Hexagonal packing may be desirable because it results in a greater density of structures than rectangular packing. When randomized as in FIG. 4, these structures combine anti-glare and hiding attributes.

In other designs the cones above are replaced by any of a variety of shapes that suppress the wide angle light intensity, including rectangular pyramids, triangular pyramids, prisms, and linear prisms. These structures are placed in randomized rectangular grids, hexagonal grids, or other periodic and non-periodic arrangements. Other shapes may also be desirable for reducing glare because of their partial collimating properties, such as hemispheres, spherical caps, and aspheric lenses.

Figure 5:
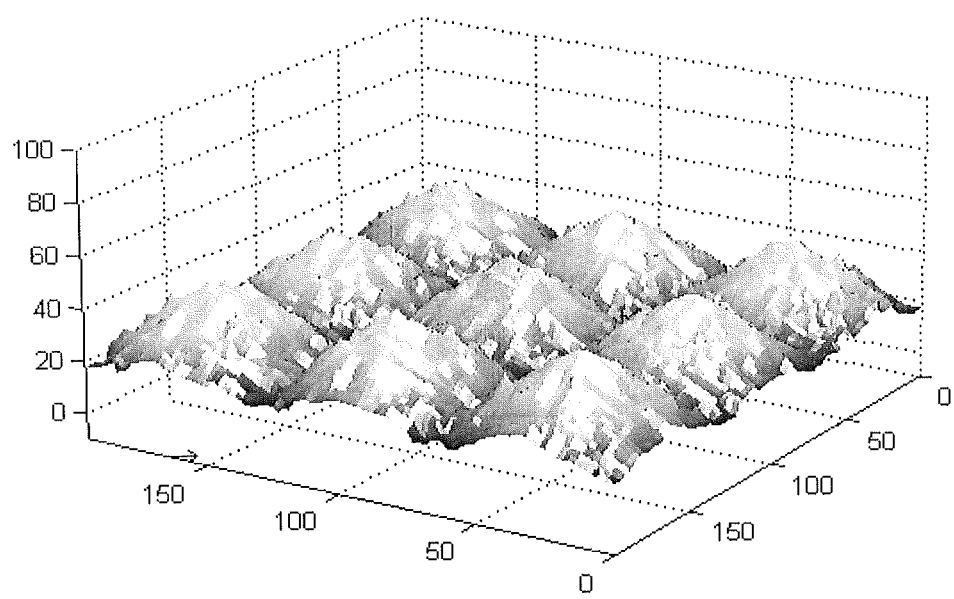
FIG. 5 illustrates a plurality of optical microstructures that include upright cones with random roughness on a rectangular grid, according to various embodiments described herein.

Randomization of the structures serves to break up the symmetry of the surface, causing light that is reflected and refracted from nearby structures to be scrambled in the far field. The degree of scrambling can be continuously adjusted by changing the magnitude of randomization parameters, such as the range of heights and position shifts. Other parameters used in randomizing the antiglare structures include: base angles, base size, and tilt of each structure about its center vertical axis. Other optical effects can be achieved by superimposing a fine random roughness on top of each structure as shown in FIG. 5.

Figure 6:
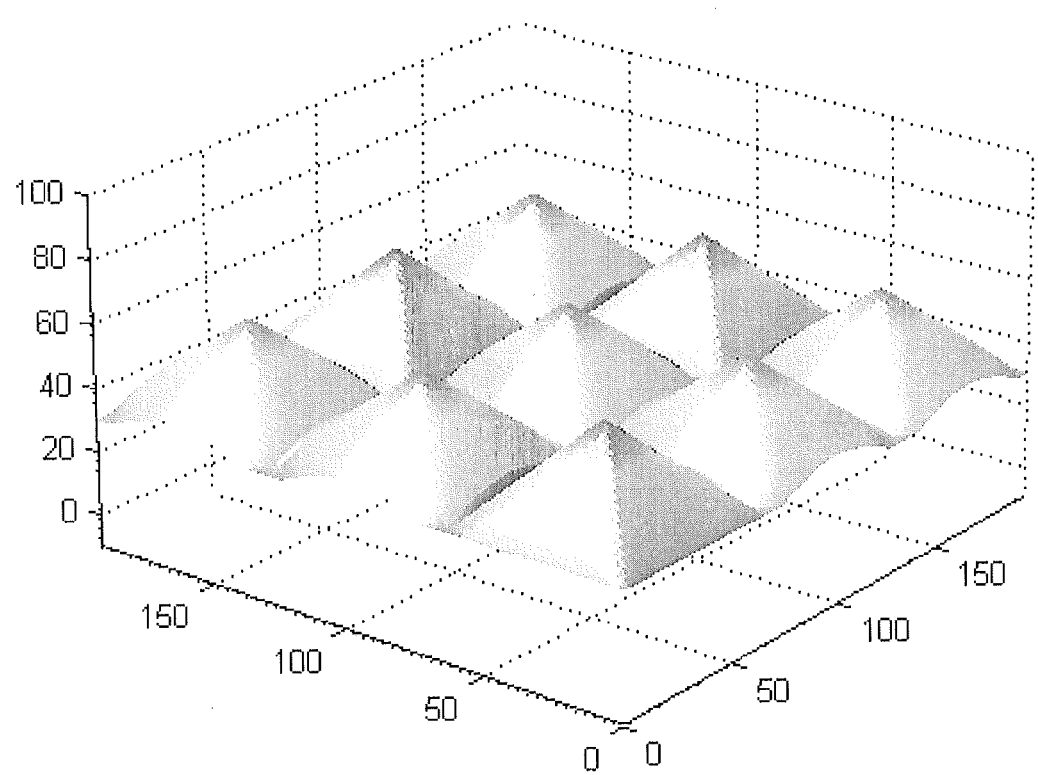
FIG. 6 illustrates a plurality of optical microstructures that include cones with interspersed pyramids on a rectangular grid, according to various embodiments described herein.

Still other properties are achievable by interspersing different shape structures as illustrated in FIG. 6. In this example, the circular cones are mixed with individual square pyramids of similar dimension. When the elements are mixed on a scale smaller than about 100 µm, they cannot be resolved by the human eye at conventional viewing distances, and the glare-control surface has a smooth macroscopic appearance. Instead, if the differing structures are interspersed in larger groups, with group dimensions greater than 100-300 µm, then the surface texture is visible to the eye. This type of shape mixing can achieve both anti-glare and hiding properties, while imparting a geometric or artistic appearance to the surface.

Figure 7:
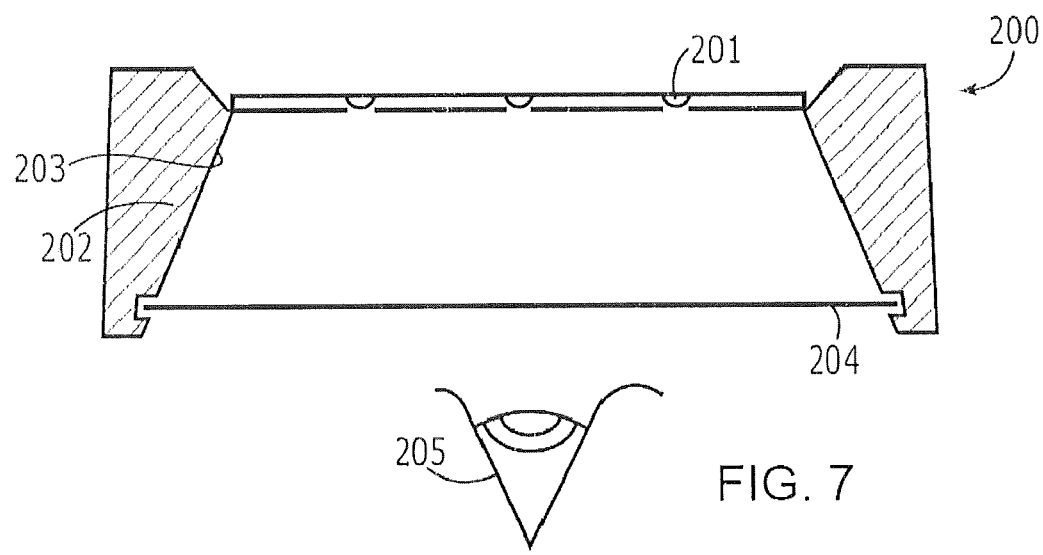
FIG. 7 is a simplified cross-sectional view of a luminaire according to various embodiments described herein.

FIG. 7 is a simplified cross-sectional view of a luminaire according to various embodiments described herein. In embodiments of FIG. 7, a light transmissive structure such as a diffuser 204 according to any of the embodiments described herein is included in an LED luminaire 200. The luminaire 200 has LED light sources 201 enclosed within a housing 202 such as a metal container with an inside surface painted with a highly-reflective white coating 203. In operation, the light generated by the LEDs 201 appears to be radiating from the diffuser 204, and the individual LED light sources 201 are not visible to a viewer on the opposite side of diffuser 204 than the LEDs 201 (represented by an eyeball 205) at appropriate viewing angles and at normal viewing distances. Glare also may be reduced. Other light sources also may be used.

In some embodiments, the optical diffuser may include an optically transparent sheet having optical microstructures replicated on a surface. The microstructures may be produced by replicating a master. For example, an optical diffuser can be made by replication of a master containing the desired shapes as described in U.S. Pat. No. 7,190,387 to Rinehart et al., entitled Systems And Methods for Fabricating Optical Microstructures Using a Cylindrical Platform and a Rastered Radiation Beam; U.S. Pat. No. 7,867,695 to Freese et al., entitled Methods for Mastering Microstructures Through a Substrate Using Negative Photoresist; and/or U.S. Pat. No. 7,192,692 to Wood et al., entitled Methods for Fabricating Microstructures by Imaging a Radiation Sensitive Layer Sandwiched Between Outer Layers, assigned to the assignee of the present invention, the disclosures of all of which are incorporated herein by reference in their entirety as if set forth fully herein. The masters themselves may be fabricated using laser scanning techniques described in these patents, and may also be replicated to provide diffusers using replicating techniques described in these patents.

The present invention has been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

When an element is referred to as being coupled or connected to/with another element, it can be directly coupled or connected to/with the other element or intervening elements may also be present. In contrast, if an element is referred to as being directly coupled or connected to/with another element, then no other intervening elements are present. As used herein, the term "and/or" includes any and all combinations of one or more of the associated listed items. The symbol "/" is also used as a shorthand notation for "and/or".

It will be understood that although the terms first and second are used herein to describe various regions, layers and/or sections, these regions, layers and/or sections should not be limited by these terms. These terms are only used to distinguish one region, layer or section from another region, layer or section. Thus, a first region, layer or section discussed above could be termed a second region, layer or section, and similarly, a second region, layer or section could be termed a first region, layer or section without departing from the teachings of the present invention. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A light transmissive structure comprising:
a light transmissive substrate including a plurality of optical microstructures, wherein the plurality of optical microstructures comprise a plurality of cones;
the plurality of optical microstructures having a geometric feature that is configured to reduce glare in light transmitted through the light transmissive structure;
the plurality of optical microstructures also having a geometric feature that is configured to vary randomly and/or pseudorandomly across the light transmissive substrate so as to diffuse light transmitted through the light transmissive structure including the plurality of cones having a base angle that varies randomly and/or pseudorandomly across the light transmissive substrate.

2. A light transmissive structure according to claim 1:
wherein the plurality of optical microstructures also have a geometric feature that is configured to produce a visible indicia relative to a viewer of the light transmissive structure.

3. A light transmissive structure according to claim 1:
wherein the plurality of optical microstructures have a geometric feature that is configured to reduce glare in light transmitted through the light transmissive structure by reducing brightness of light emerging from the light transmissive structure at angles greater than about 60° from a direction orthogonal to the light transmissive substrate relative to light emerging from the light transmissive structure in the direction orthogonal to the light transmissive substrate.

4. A light transmissive structure according to claim 3:
wherein the plurality of optical microstructures have a geometric feature that is configured to reduce glare in light transmitted through the light transmissive structure by reducing brightness of light emerging from the light transmissive structure at angles greater than about 60° from the direction orthogonal to the light transmissive substrate to less than about 25% of the light emerging from the light transmissive structure in the direction orthogonal to the light transmissive substrate.

5. A light transmissive structure according to claim 1 wherein the geometric feature that is configured to vary randomly and/or pseudorandomly across the light transmissive substrate includes the plurality of cones having a height that varies randomly and/or pseudorandomly across the light transmissive substrate.

6. A light transmissive structure according to claim 1 wherein the geometric feature that is configured to reduce glare in light transmitted through the light transmissive structure and the geometric feature that is configured to vary randomly and/or pseudorandomly across the light transmissive substrate so as to diffuse light transmitted through the light transmissive structure are different geometric features of the plurality of optical microstructures.

7. A light transmissive structure according to claim 1 wherein the geometric feature that is configured to reduce glare in light transmitted through the light transmissive structure and the geometric feature that is configured to vary randomly and/or pseudorandomly across the light transmissive substrate so as to diffuse light transmitted through the light transmissive structure comprise a size and/or shape of the plurality of optical microstructures.

8. A light transmissive structure according to claim 1 wherein the optical microstructures have a dimension along the light transmissive substrate that is less than about 100 µm.

9. A light transmissive structure according to claim 1 in combination with at least one light source and a housing that is configured to hold the at least one light source and the light transmissive substrate.

10. A light transmissive structure according to claim 1 wherein the geometric feature that is configured to vary randomly and/or pseudorandomly across the light transmissive substrate includes the plurality of cones having a shift in position that varies randomly and/or pseudorandomly across the light transmissive substrate.

11. A light transmissive structure according to claim 1 wherein the optical microstructures have a dimension along the light transmissive substrate that is less than about 100 µm such that the light transmissive structure has a substantially smooth macroscopic appearance relative to a viewer of the light transmissive structure.

12. A light transmissive structure according to claim 1 wherein the plurality of optical microstructures extend along the substrate in a longitudinal direction and in a transverse direction, and wherein the plurality of optical microstructures have a geometric feature that is configured to reduce glare in light transmitted through the light transmissive structure in each of the longitudinal and transverse directions.

13. A light transmissive structure comprising:
a light transmissive substrate including a plurality of optical microstructures;
the plurality of optical microstructures having a geometric feature that is configured to reduce glare in light transmitted through the light transmissive structure;
the plurality of optical microstructures also having a geometric feature that is configured to produce a visible indicia relative to a viewer of the light transmissive structure;
wherein the plurality of optical microstructures have a geometric feature that is configured to reduce glare in light transmitted through the light transmissive structure by reducing brightness of light emerging from the light transmissive structure at angles greater than about 60° from a direction orthogonal to the light transmissive substrate to less than about 25% of the light emerging from the light transmissive structure in the direction orthogonal to the light transmissive substrate.

14. A light transmissive structure according to claim 13 wherein the plurality of optical microstructures comprise a plurality of cones, inverted cones, spheroids, prisms, inverted prisms, inverted spheroids, pyramids and/or inverted pyramids.

15. A light transmissive structure according to claim 13 wherein the geometric feature that is configured to reduce glare in light transmitted through the light transmissive structure and the geometric feature that is configured to produce a visible indicia relative to a viewer of the light transmissive structure comprise a size and/or shape of the plurality of optical microstructures.

16. A light transmissive structure according to claim 13 wherein the optical microstructures have a dimension along the light transmissive substrate that is less than about 100 µm.

17. A light transmissive structure according to claim 13 in combination with at least one light source and a housing that is configured to hold the at least one light source and the light transmissive substrate.

18. A light transmissive structure according to claim 13 wherein the geometric feature that is configured to reduce glare in light transmitted through the light transmissive structure and the geometric feature that is configured to produce a visible indicia relative to a viewer of the light transmissive structure are different geometric features of the plurality of optical microstructures.

19. A light transmissive structure comprising:
a light transmissive substrate including a plurality of optical microstructures, wherein the plurality of optical microstructures comprise a plurality of cones and/or pyramids;
the plurality of optical microstructures having a base angle that varies randomly and/or pseudorandomly across the light transmissive substrate between about 35° and about 55° from a direction orthogonal to the light transmissive substrate.

20. A light transmissive structure according to claim 19: wherein the base angle varies randomly and/or pseudorandomly across the light transmissive substrate between about 48° and about 54° from the direction orthogonal to the light transmissive substrate.

21. A light transmissive structure according to claim 19: wherein the base angle also varies as a function of distances greater than about 100 µm across the substrate.

22. A light transmissive structure according to claim 19 wherein the optical microstructures have a dimension along the light transmissive substrate that is less than about 100 µm.

23. A light transmissive structure according to claim 19 in combination with at least one light source and a housing that is configured to hold the at least one light source and the light transmissive substrate.

24. A method of fabricating a light transmissive structure comprising:
imaging into a photoimageable material an image of a plurality of optical microstructures having a geometric feature that is configured to reduce glare in light transmitted through the optical microstructures and also having a geometric feature that is configured to vary randomly and/or pseudorandomly across the photoimageable material; and
using the photoimageable material that was imaged to replicate a plurality of microstructures in and/or on a substrate, the plurality of optical microstructures also having a geometric feature that is configured to reduce glare in light transmitted through the optical microstructures and also having a geometric feature that is configured to vary randomly and/or pseudorandomly across the substrate so as to diffuse light transmitted through the optical microstructures.

25. A method according to claim 24 wherein the imaging comprises scanning a laser across the photoimageable material, the laser defining the image of a plurality of optical microstructures having the geometric feature that is configured to reduce glare in light transmitted through the optical microstructures and also having the geometric feature that is configured to vary randomly and/or pseudorandomly across the photoimageable material.

* * * * *